(12) United States Patent
Smith et al.

(10) Patent No.: US 10,086,367 B2
(45) Date of Patent: Oct. 2, 2018

(54) PHOSPHORUS-CONTAINING FCC CATALYST

(71) Applicant: BASF CORPORATION, Florham Park, NJ (US)

(72) Inventors: Gary M. Smith, Verona, NJ (US); Robert McGuire, Jr., Nanuet, NY (US); Bilge Yilmaz, New York, NY (US)

(73) Assignee: BASF CORPORATION, Florham Park, NJ (US)

( * ) Notice: Subject to any disclaimer, the term of this patent is extended or adjusted under 35 U.S.C. 154(b) by 4 days.

(21) Appl. No.: 15/426,843

(22) Filed: Feb. 7, 2017

(65) Prior Publication Data

US 2017/0144137 A1 May 25, 2017

Related U.S. Application Data (63) Continuation of application No. 14/134,600, filed on Dec. 19, 2013.

(51) Int. Cl.

| | |
|---|---|
| *B01J 29/06* | (2006.01) |
| *B01J 29/14* | (2006.01) |
| *B01J 37/28* | (2006.01) |
| *B01J 37/02* | (2006.01) |
| *C10G 11/05* | (2006.01) |
| *C10G 11/18* | (2006.01) |
| *B01J 35/08* | (2006.01) |
| *B01J 29/08* | (2006.01) |
| *B01J 37/00* | (2006.01) |

(52) U.S. Cl.
CPC .......... *B01J 29/146* (2013.01); *B01J 29/088* (2013.01); *B01J 35/08* (2013.01); *B01J 37/0045* (2013.01); *B01J 37/0201* (2013.01); *B01J 37/28* (2013.01); *C10G 11/05* (2013.01); *C10G 11/18* (2013.01); *B01J 2229/186* (2013.01); *B01J 2229/20* (2013.01)

(58) Field of Classification Search
CPC .. B01J 2229/20; B01J 2229/186; B01J 35/08; B01J 37/0045; B01J 37/28; C10G 11/18; C10G 11/05
USPC .................... 502/8, 10, 60, 65, 79
See application file for complete search history.

(56) References Cited

U.S. PATENT DOCUMENTS

| | | | |
|---|---|---|---|
| 3,409,541 A | 11/1968 | Flanders et al. | |
| 4,192,770 A | 3/1980 | Singleton | |
| 4,295,955 A | 10/1981 | Tu | |
| 4,430,199 A | 2/1984 | Durante et al. | |
| 4,493,902 A * | 1/1985 | Brown ................ | B01J 29/084 423/712 |
| 4,663,018 A | 5/1987 | Reid et al. | |
| 4,919,787 A | 4/1990 | Chester et al. | |
| 5,071,539 A | 12/1991 | Hayward et al. | |
| 5,151,394 A | 9/1992 | Chitnis et al. | |
| 5,258,113 A | 11/1993 | Edgerton et al. | |
| 5,300,215 A | 4/1994 | Chitnis et al. | |
| 5,378,670 A | 1/1995 | Kumar | |
| 5,395,809 A | 3/1995 | Madon et al. | |
| 5,559,067 A | 9/1996 | Lerner et al. | |
| 5,618,407 A | 4/1997 | Kallenbach et al. | |
| 5,993,645 A * | 11/1999 | Madon ................ | B01J 29/084 208/114 |
| 6,080,901 A | 6/2000 | Drake et al. | |
| 6,110,357 A | 8/2000 | Senn et al. | |
| 6,174,432 B1 | 1/2001 | Mizutani et al. | |
| 6,656,347 B2 | 12/2003 | Stockwell et al. | |
| 6,673,235 B2 | 1/2004 | Harris et al. | |
| 6,716,338 B2 | 4/2004 | Madon et al. | |
| 6,942,783 B2 | 9/2005 | Xu et al. | |
| 7,122,493 B2 | 10/2006 | Ou et al. | |
| 7,122,494 B2 | 10/2006 | Ou et al. | |
| 8,197,669 B2 | 6/2012 | Vierheilig | |
| 2003/0209468 A1 | 11/2003 | Su et al. | |
| 2004/0232047 A1 | 11/2004 | Benazzi et al. | |
| 2008/0293561 A1* | 11/2008 | Long ................ | B01J 29/06 502/65 |
| 2008/0314798 A1* | 12/2008 | Stockwell ............... | B01J 21/16 208/118 |
| 2011/0000821 A1* | 1/2011 | Stockwell ............... | B01J 21/16 208/120.01 |
| 2011/0224471 A1* | 9/2011 | Wormsbecher ........ | C10G 11/18 585/899 |

(Continued)

FOREIGN PATENT DOCUMENTS

| | | |
|---|---|---|
| CN | 1325940 | 12/2001 |
| CN | 101537368 | 9/2009 |
| GB | 1 313 174 | 4/1973 |
| JP | 09-085097 | 3/1997 |
| JP | 2010-082547 | 4/2010 |
| WO | WO-94/21378 | 9/1994 |

OTHER PUBLICATIONS

Extended European Search Report in EP Application No. 14871155.9, dated Sep. 18, 2017 (11 pages).
Notice of Allowance in U.S. Appl. No. 14/134,640, dated Jun. 22, 2017 (9 pages).
Final Office Action in U.S. Appl. No. 14/134,600, dated Oct. 26, 2016 (13 pages).

(Continued)

*Primary Examiner* — Elizabeth D Wood
(74) *Attorney, Agent, or Firm* — Foley & Lardner LLP (57) ABSTRACT

Described are fluid catalytic cracking (FCC) compositions, methods of manufacture and use. FCC catalyst compositions comprise catalytic microspheres containing a zeolite, a non-zeolitic component, and a rare earth component. The microspheres are modified with phosphorus. The FCC catalyst composition can be used to crack hydrocarbon feeds, particularly resid feeds containing high V and Ni, resulting in lower hydrogen and coke yields.

15 Claims, 2 Drawing Sheets

(56) References Cited

U.S. PATENT DOCUMENTS

| | | | |
|---|---|---|---|
| 2012/0037540 A1 | 2/2012 | Jansen et al. | |
| 2012/0228194 A1 | 9/2012 | Folmar et al. | |
| 2013/0005565 A1* | 1/2013 | Shu | B01J 29/084 |
| | | | 502/65 |
| 2013/0066131 A1* | 3/2013 | Harris | B01J 37/28 |
| | | | 585/653 |
| 2013/0115104 A1 | 5/2013 | Pons | |
| 2013/0115164 A1* | 5/2013 | Fu | B01J 37/04 |
| | | | 423/713 |
| 2014/0024866 A1* | 1/2014 | Springs | C10G 1/086 |
| | | | 585/240 |

OTHER PUBLICATIONS

International Search Report for PCT/US2014/069816 dated Mar. 30, 2015, 4 pages.

McLean, Joseph et al., Multi-stage reaction catalysts: Recently trialled manufacturing technology combines two or more FCC catalyst functionalities within the same catalyst particle, PTQ, Q3, (2011), 8 pages.

Non-Final Office Action in U.S. Appl. No. 14/134,640, dated Sep. 29, 2016 (9 pages).

Non-Final Office Action in U.S. Appl. No. 14/134,600, dated May 5, 2016.

\* cited by examiner

PHOSPHORUS-CONTAINING FCC CATALYST

CROSS-REFERENCE TO RELATED APPLICATIONS

This application is a continuation of U.S. application Ser. No. 14/134,600, filed on Dec. 19, 2013, now abandon which is incorporated herein by reference in its entirety.

TECHNICAL FIELD

The present invention relates to a fluid catalytic cracking catalyst and to a hydrocarbon catalytic cracking process using the catalyst. More particularly, the invention relates to a phosphorus-containing catalyst for processing metal contaminated resid feeds.

BACKGROUND

Catalytic cracking is a petroleum refining process that is applied commercially on a very large scale. Catalytic cracking, and particularly fluid catalytic cracking (FCC), is routinely used to convert heavy hydrocarbon feedstocks to lighter products, such as gasoline and distillate range fractions. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

It has been recognized that for a fluid catalytic cracking catalyst to be commercially successful, it must have commercially acceptable activity, selectivity, and stability characteristics. It must be sufficiently active to give economically attractive yields, have good selectivity towards producing products that are desired and not producing products that are undesired, and it must be sufficiently hydrothermally stable and attrition resistant to have a commercially useful life.

Excessive coke and hydrogen are undesirable in commercial catalytic cracking processes. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking in current FCC catalyst is attributable to both the zeolite and non-zeolite (e.g. matrix) components. Zeolite cracking tends to be gasoline selective, while matrix cracking tends to be less gasoline selective.

In recent years, the oil refining industry has shifted to processing a larger quantity of residual (resid) and resid-containing feeds due to changes in the price structure and availability of crude oil. Many refiners have been processing at least a portion of residual oil in their units and several now run a full residual oil cracking program. Processing resid feeds can drastically alter yields of valuable products in a negative direction relative to a light feed. Aside from operational optimizations, the catalyst has a large impact on product distribution. Several factors are important to resid catalyst design. It is highly favorable if the catalyst can minimize coke and hydrogen formation, maximize catalyst stability, and minimize deleterious contaminant selectivity due to metal contaminants in resid feedstocks.

Resid feeds typically contain contaminant metals including Ni, V, Fe, Na, Ca, and others. Resid FCC for converting heavy resid feeds with high Ni and V contaminants constitutes the fastest growing FCC segment globally. Both Ni and V catalyze unwanted dehydrogenation reactions, but Ni is an especially active dehydrogenation catalyst. Ni significantly increases $H_2$ and coke yields. In addition to taking part in unwanted dehydrogenation reactions, V comes with other major concerns as it is highly mobile under FCC conditions and its interaction with the zeolite destroys its framework structure, which manifests itself as increased $H_2$ and coke yields, as well as lower zeolite surface area retention. Even small amounts (e.g., 1-5 ppm) of contaminant metals in the feed deposit cumulatively on the catalyst and can result in high $H_2$ and coke yields during FCC operation, which is a major concern for the refining industry.

Since the 1960s, most commercial fluid catalytic cracking catalysts have contained zeolites as an active component. Such catalysts have taken the form of small particles, called microspheres, containing both an active zeolite component and a non-zeolite component in the form of a high alumina, silica-alumina (aluminosilicate) matrix. The active zeolitic component is incorporated into the microspheres of the catalyst by one of two general techniques. In one technique, the zeolitic component is crystallized and then incorporated into microspheres in a separate step. In the second technique, the in situ technique, microspheres are first formed and the zeolitic component is then crystallized in the microspheres themselves to provide microspheres containing both zeolitic and non-zeolitic components. For many years a significant proportion of commercial FCC catalysts used throughout the world have been made by in situ synthesis from precursor microspheres containing kaolin that had been calcined at different severities prior to formation into microspheres by spray drying. U.S. Pat. No. 4,493,902 ("the '902 patent"), incorporated herein by reference in its entirety, discloses the manufacture of fluid cracking catalysts comprising attrition-resistant microspheres containing high Y zeolite, formed by crystallizing sodium Y zeolite in porous microspheres composed of metakaolin and spinel. The microspheres in the '902 patent contain more than about 40%, for example 50-70% by weight Y zeolite. Such catalysts can be made by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. This characteristic kaolin exothermic reaction is sometimes referred to as kaolin calcined through its "characteristic exotherm." The microspheres containing the two forms of calcined kaolin clay are immersed in an alkaline sodium silicate solution, which is heated, until the maximum obtainable amount of Y zeolite with faujasite structure is crystallized in the microspheres.

Fluid cracking catalysts which contain silica-alumina or alumina matrices are termed catalysts with "active matrix." Catalysts of this type can be compared with those containing untreated clay or a large quantity of silica, which are termed "inactive matrix" catalysts. In relation to catalytic cracking, despite the apparent disadvantage in selectivity, the inclusion of aluminas or silica-alumina has been beneficial in certain circumstances. For instance when processing a hydrotreated/demetallated vacuum gas oil (hydrotreated VGO) the penalty in non-selective cracking is offset by the benefit of cracking or "upgrading" the larger feed molecules which are initially too large to fit within the rigorous confines of the zeolite pores. Once "precracked" on the alumina or silica-alumina surface, the smaller molecules may then be selectively cracked further to gasoline material over the zeolite portion of the catalyst. While one would expect that this precracking scenario might be advantageous for resid feeds, they are, unfortunately, characterized as being heavily contaminated with metals such as nickel and vanadium and, to a lesser extent, iron. When a metal such as nickel deposits on a high surface area alumina such as those found in typical FCC catalysts, it is dispersed and participates as highly active centers for the catalytic reactions which result in the formation of contaminant coke (contaminant coke refers to the coke produced discretely from reactions catalyzed by contaminant metals). This additional coke exceeds that which is acceptable by refiners. Loss of activity or selectivity of the catalyst may also occur if the metal contaminants (e.g. Ni, V) from the hydrocarbon feedstock deposit onto the catalyst. These metal contaminants are not removed by standard regeneration (burning) and contribute to high levels of hydrogen, dry gas and coke and reduce significantly the amount of gasoline that can be made.

It would be desirable to provide FCC catalyst compositions, methods of manufacture, and FCC processes that reduce coke and hydrogen yields, in particular, in feeds containing high levels of transition metals, for example, in a resid feed.

SUMMARY

One aspect of the invention is directed to a fluid catalytic cracking (FCC) catalyst composition for processing resid feeds. Various embodiments are listed below. It will be understood that the embodiments listed below may be combined not only as listed below, but in other suitable combinations in accordance with the scope of the invention.

In embodiment one, the catalyst composition comprises: catalytic microspheres containing a non-zeolitic component, 5 to 25% by weight of a transition alumina, 20% to 65% by weight of a zeolite component intergrown with the non-zeolitic component, a rare earth component and 1% to 5% by weight of a phosphorus component on an oxide basis, wherein the catalytic microspheres are obtained by forming rare earth-containing microspheres containing the non-zeolitic component, the transition alumina, the zeolite component intergrown within the non-zeolitic component, and yttria or a rare earth component, and further adding the phosphorus component to the rare earth-containing microspheres to provide the catalytic microspheres, and wherein the FCC catalyst composition is effective in preventing at least one of nickel and vanadium from increasing coke and hydrogen yields during cracking of a hydrocarbon.

Embodiment two is directed to a modification of catalyst composition embodiment one, wherein the non-zeolitic component is selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia and sepiolite.

Embodiment three is directed to a modification of catalyst composition embodiment one or two, wherein the phosphorus component is in the range of 2 wt. % to about 4.0 wt. % $P_2O_5$ on an oxide basis.

Embodiment four is directed to a modification of any of catalyst composition embodiments one through three, wherein the rare-earth component is selected from one or more of ceria, lanthana, praseodymia, and neodymia.

Embodiment five is directed to a modification of any of catalyst composition embodiments one through four, wherein the rare earth component is lanthana, and the lanthana is present in a range of 1 wt. % to about 5.0 wt. % on an oxide basis.

Embodiment six is directed to a modification of any of catalyst composition embodiments one through five, wherein the phosphorus component is present in a range of 2 wt. % and about 3.5 wt. % $P_2O_5$ on an oxide basis.

Embodiment seven is directed to a modification of any of catalyst composition embodiments one through six, wherein the microsphere has a phosphorus level of about 2.5-3.5 wt. % $P_2O_5$ on an oxide basis and the rare earth metal component is present in an amount of about 2-3 wt. % on an oxide basis.

Another aspect of the invention is directed to a method of cracking a hydrocarbon feed under fluid catalytic cracking conditions. Therefore, an eighth embodiment of the invention is directed to a method comprising contacting the hydrocarbon feed with the catalyst composition of any of embodiments one through seven.

Embodiment nine is directed to a modification of method embodiment eight, wherein the non-zeolitic matrix component is selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia and sepiolite.

Embodiment ten is directed to a modification of method embodiment eight or nine, wherein the phosphorus component is in the range of 1 wt. % to about 5.0 wt. % $P_2O_5$ on an oxide basis.

Embodiment eleven is directed to a modification of any of method embodiments eight through ten, wherein the rare-earth component is selected from one or more of ceria, lanthana, praseodymia, and neodymia.

Embodiment twelve is directed to a modification of any of method embodiments eight through eleven, wherein the rare earth component is lanthana, and the lanthana is present in a range of 1 wt. % to about 5.0 wt. % on an oxide basis.

Embodiment thirteen is directed to a modification of any of method embodiments eight through twelve, wherein the microsphere has a phosphorus level of about 2.5 to 3.5 wt. % $P_2O_5$ on an oxide basis, and the rare-earth metal component is present in an amount of about 2-3 wt. %, based on the weight of the catalyst.

Another aspect of the invention is directed to a method of manufacturing an FCC catalyst. Therefore, a fourteenth embodiment of the invention is directed to a method comprising pre-forming a precursor microsphere comprising a non-zeolitic material and alumina; in situ crystallizing a zeolite on the pre-formed microsphere to provide a zeolite-containing microsphere; adding a rare earth component to the zeolite-containing microsphere to provide a rare-earth-containing microsphere; and adding a phosphorus component to the rare earth-containing precursor microsphere to provide a catalytic microsphere.

Embodiment fifteen is directed to a modification of method embodiment fourteen, wherein the phosphorus component is added by contact with diammonium phosphate.

Embodiment sixteen is directed to a modification of method embodiment fourteen or fifteen, wherein the rare earth component comprises lanthana, wherein the lanthana is added by ion exchange.

Embodiment seventeen is directed to a modification of any of method embodiments fourteen through sixteen, further comprising adding a phosphorus component to the zeolite-containing microsphere.

Embodiment eighteen is directed to a modification of any of method embodiments fourteen through seventeen, wherein the rare earth component and the phosphorus component are added sequentially in separate steps.

Embodiment nineteen is directed to a modification of any of method embodiments fourteen through eighteen, wherein the method comprises adding a portion of the phosphorus component, then ion exchanging the rare earth component and then adding an additional phosphorus component.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Embodiments of the present invention provide a FCC catalyst using phosphorus-modified microspheres, which, according to one or more embodiments, can be made by spray drying a mixture of mullite, hydrous kaolin, boehmite, and a silicate binder, followed by the in situ crystallization of zeolite Y, and then ion exchange, phosphorus loading and calcination. Phosphorus modification of FCC catalyst microspheres not only results in lower hydrogen and coke yields but also results in higher zeolite surface area retention rates when processing hydrocarbon feeds, particularly resid feeds contaminated with transition metals, namely Ni and V.

According to one or more embodiments, a catalyst composition is provided which exhibits higher performance due to the interaction of the phosphate species with contaminant metals. The phosphate species prevents contaminant metals from interfering with catalyst selectivity, reducing coke and hydrogen yields, and enhancing zeolite stability.

With respect to the terms used in this disclosure, the following definitions are provided.

As used herein, the term "catalyst" or "catalyst composition" or "catalyst material" refers to a material that promotes a reaction.

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

"Cracking conditions" or "FCC conditions" refers to typical FCC process conditions. Typical FCC processes are conducted at reaction temperatures of 450° to 650° C. with catalyst regeneration temperatures of 600° to 850° C. Hot regenerated catalyst is added to a hydrocarbon feed at the base of a rise reactor. The fluidization of the solid catalyst particles may be promoted with a lift gas. The catalyst vaporizes and superheats the feed to the desired cracking temperature. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products are fractionated into a series of products, including gas, gasoline, light gas oil, and heavy cycle gas oil. Some heavier hydrocarbons may be recycled to the reactor.

As used herein, the term "feed" or "feedstock" refers to that portion of crude oil that has a high boiling point and a high molecular weight. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

As used herein, the term "resid" refers to that portion of crude oil that has a high boiling point and a high molecular weight and typically contains contaminant metals including Ni, V, Fe, Na, Ca, and others. The contaminant metals, particularly Ni and V, have detrimental effects on catalyst activity and performance. In some embodiments, in a resid feed operation one of Ni and V metals accumulate on the catalyst, and the FCC catalyst composition is effective to contact nickel and vanadium during cracking.

As used herein, the term "non-zeolitic component" refers to the components of a FCC catalyst that are not zeolites or molecular sieves. As used herein, the non-zeolitic component can comprise binder and filler. A non-zeolitic component may be referred to as the matrix. According to one or more embodiments, the "non-zeolitic component" can be selected from the group consisting of clay, kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia and sepiolite. The non-zeolitic component can be an aluminosilicate.

As used herein, the term "zeolite" refers to is a crystalline aluminosilicate with a framework based on an extensive three-dimensional network of oxygen ions and have a substantially uniform pore distribution.

As used herein, the term "intergrown zeolite" refers to a zeolite that is formed by an in situ crystallization process.

As used herein, the term "in situ crystallized" refers to the process in which a zeolite is grown or intergrown directly on/in a microsphere and is intimately associated with the matrix or non-zeolitic material, for example, as described in U.S. Pat. Nos. 4,493,902 and 6,656,347. The zeolite is intergrown within the macropores of the microsphere, such that the zeolite is uniformly dispersed on the matrix or non-zeolitic material.

As used herein, the terms "preformed microspheres" or "precursor microspheres" refer to microspheres obtained by spray drying and calcining a non-zeolitic matrix component and a transition alumina.

As used herein, the term "zeolite-containing microsphere" refers to a microsphere obtained by in situ crystallizing a zeolite material on pre-formed precursor microspheres. The zeolite is intergrown directly on/in the macropores of the precursor microsphere such that the zeolite is intimately associated and uniformly dispersed on the matrix or non-zeolitic material.

As used herein, the term "rare-earth-containing microsphere" refers to microspheres that include an in situ crystallized zeolite (i.e. zeolite-containing microsphere) and are treated with a rare earth component such that the rare earth component is intimately associated with the matrix or non-zeolitic material.

As used herein, the term "catalytic microsphere" refers to microspheres that are obtained by addition of a phosphorus component to a rare-earth-containing microsphere. Catalytic microspheres contain a non-zeolitic component (or matrix material), a transition alumina, an in situ crystallized zeolite, a rare-earth component, and a phosphorus component.

"Transition alumina" is defined as any alumina which is intermediate between the thermodynamically stable phases of gibbsite, bayerite, boehmite, pseudoboehmite and nordstrandite on one end of the spectrum and alpha alumina or corundum on the other. Such transition aluminas may be viewed as metastable phases. A scheme of the transformation sequence can be found in the text: Oxides and Hydroxides of Aluminum by K. Wefers and C. Misra; Alcoa Technical Paper No. 19, revised; copyright Aluminum Company of America Laboratories, 1987.

FCC catalyst compositions which include a zeolite component have a catalytically active crystallized aluminosilicate material, such as, for example, a large-pore zeolite crystallized on or in a microsphere comprising non-zeolitic material. Large pore zeolite cracking catalysts have pore openings of greater than about 7 Angstroms in effective diameter. Conventional large-pore molecular sieves include zeolite X; REX; zeolite Y; Ultrastable Y (USY); Rare Earth exchanged Y (REY); Rare Earth exchanged USY (REUSY); Dealuminated Y (DeAl Y); Ultrahydrophobic Y (UHPY); and/or dealuminated silicon-enriched zeolites, e.g., LZ-210. According to one or more embodiments, the FCC catalyst comprises catalytic microspheres comprising a crystalline aluminosilicate material selected from zeolite Y, ZSM-20, ZSM-5, zeolite beta, zeolite L; and naturally occurring zeolites such as faujasite, mordenite and the like, and a non-zeolitic component. These materials may be subjected to conventional treatments, such calcinations and ion exchange with rare earths to increase stability.

Microspheres comprising hydrous kaolin clay and/or metakaolin, a dispersible boehmite, optionally spinel and/or mullite, and a sodium silicate or silica sol binder can be prepared in accordance with the techniques described in U.S. Pat. No. 6,716,338, which is incorporated herein by reference. For example, the catalysts can be made by crystallizing the desired amount of sodium Y zeolite in porous microspheres composed of a mixture of two different forms of chemically reactive calcined clay, namely, metakaolin and spinel. The microspheres containing the two forms of calcined kaolin clay are immersed in an alkaline sodium silicate solution, which is heated, until the maximum obtainable amount of Y zeolite is crystallized in the microspheres. The amount of zeolite according to embodiments of the invention is in the range of 20% to 95%, or 30% to 60%, or 30% to 45% by weight based on the weight of the FCC catalyst composition.

Preparation of Phosphorus Containing Microspheres

A first aspect of the invention is directed to a fluid catalytic cracking (FCC) catalyst composition for resid feed refining. In one or more embodiments, the FCC catalyst composition comprises catalytic microspheres containing a non-zeolitic component, 5 to 25% by weight of a transition alumina, 20% to 95% by weight of a zeolite component intergrown with the non-zeolitic component, a rare earth component and 1% to 5% by weight of a phosphorus component on an oxide basis. In one or more embodiments, the catalytic microspheres are obtained by forming rare-earth containing microspheres containing the non-zeolitic component, the transition alumina, the zeolite component intergrown within the non-zeolitic component, and the rare earth component, and further adding the phosphorus component to the rare earth-containing microspheres to provide the catalytic microspheres. In one or more embodiments, the FCC catalyst composition is effective to prevent at least one of nickel and vanadium from increasing coke and hydrogen yields during cracking of a hydrocarbon.

An aqueous slurry of finely divided hydrous kaolin, kaolin that has been calcined through its characteristic exotherm, and binder is prepared. The slurry can optionally contain boehmite. In specific embodiments, the hydrous kaolin, calcined kaolin and binder are premixed in one tank and fed to the spray drier from one line. When present, an aqueous alumina slurry, peptized such as with formic acid is introduced from a separate line immediately prior to when the whole mix enters the spray drier. Other mixing and injection protocols may also be useful. For example, a polymer dispersed alumina, for example dispersed with Flosperse® can be used in the process. The final slurry solids are about 30-70 wt. %. The aqueous slurry is then spray dried to obtain microspheres comprising a silica bonded mixture of hydrated kaolin, boehmite and kaolin that has been calcined at least substantially through its characteristic exotherm (spinel, or mullite, or both spinel and mullite). The preformed microspheres have average particle diameters that are typical of commercial fluid catalytic cracking catalysts, e.g., 65-85 microns. Suitable spray drying conditions are set forth in the '902 patent.

The reactive kaolin of the slurry to form the preformed microspheres can be formed of hydrated kaolin or calcined hydrous kaolin (metakaolin) or mixtures thereof. The hydrous kaolin of the feed slurry can suitably be either one or a mixture of ASP® 600 or ASP® 400 kaolin, derived from coarse white kaolin crudes. Finer particle size hydrous kaolins can also be used, including those derived from gray clay deposits, such as LHT pigment. Purified water-processed kaolin clays from Middle Georgia can also be used. Calcined products of these hydrous kaolins can be used as the metakaolin component of the feed slurry.

A commercial source of powdered kaolin calcined through the exotherm may be used as the spinel component. Hydrated kaolin clay is converted to this state by calcining the kaolin at least substantially completely through its characteristic exotherm. (The exotherm is detectable by conventional differential thermal analysis, DTA). After completion of calcination, the calcined clay is pulverized into finely divided particles before being introduced into the slurry that is fed to a spray dryer. The spray dried product is repulverized. The surface area (BET) of typical spinel form kaolin is low, e.g., 5-10 m²/g; however, when this material is placed in a caustic environment such as that used for crystallization, silica is leached, leaving an alumina-rich residue having a high surface area, e.g. 100-200 m²/g (BET).

Mullite can also be used as a matrix component. Mullite is made by firing clay at temperatures above 2000° F. For example M93 mullite may be made from the same kaolin clay source as Ansilex 93, used for the preparation of spinel component. Mullite can also be made from other kaolin clays. Mullite may also be made from Kyanite clay. Heating Kyanite clay to a high temperature of 3000° F., provides a more crystalline, purer mullite in the calcined product than that obtained from kaolin clay.

According to one or more embodiments, the alumina used to prepare the preformed microspheres is a highly dispersible boehmite. Dispersibility of the hydrated alumina is the property of the alumina to disperse effectively in an acidic media such as formic acid of pH less than about 3.5. Such acid treatment is known as peptizing the alumina. High dispersion is when 90% or more of the alumina disperses into particles less than about 1 micron. When this dispersed alumina solution is spray dried with the kaolin and binder, the resulting preformed microsphere contains uniformly distributed alumina throughout the microsphere.

After spray drying, the preformed microspheres are washed and calcined at a temperature and for a time (e.g., for two to four hours in a muffle furnace at a chamber temperature of about 1500° to 1550° F.) sufficient to convert the hydrated clay component of the microspheres to metakaolin, leaving the spinel component of the microspheres essentially unchanged. In specific embodiments, the calcined preformed microspheres comprise about 30 to 70% by weight metakaolin, about 10 to 50% by weight spinel and/or mullite and 5 to about 25% by weight transition phase alumina. In one or more embodiments, the transition phase alumina comprises one or more of gamma, delta, theta, eta, or chi phase. In specific embodiments, the surface area (BET, nitrogen) of the crystalline boehmite (as well as the transition alumina) is below 150 m²/g, specifically below 125 m²/g, and more specifically, below 100 m²/g, for example, 30-80 m²/g.

When boehmite is incorporated into FCC catalysts, it can serve as a trap for transition metals, especially Ni. Without intending to be bound by theory, it is thought that boehmite inhibits the dehydrogenation activity of Ni in hydrocarbon feeds by converting it to Ni-aluminate ($NiAl_2O_4$). In one or more embodiments, the catalyst comprises from about 0.5% to 20% by weight of boehmite. The transition alumina phase that results from the dispersible boehmite during the preparative procedure and which forms a portion of the matrix of the final catalyst, passivates the Ni and V that are deposited onto the catalyst during the cracking process, especially during cracking of heavy resid feeds.

The preformed or precursor microspheres are reacted with zeolite seeds and an alkaline sodium silicate solution, substantially as described in U.S. Pat. No. 5,395,809, the teachings of which are incorporated herein by cross-reference. The zeolite component is intergrown with the matrix component. The microspheres are crystallized to a desired zeolite content (for example, 20-65% by weight, or 30-60% by weight, or 30-45% by weight), filtered, washed, ammonium exchanged, exchanged with rare-earth cations if required, calcined, exchanged a second time with ammonium ions, and calcined a second time if required, and optionally ion-exchanged. The silicate for the binder can be provided by sodium silicates with $SiO_2$ to $Na_2O$ ratios of from 1.5 to 3.5, more specifically, ratios of from 2.00 to 3.22.

In specific embodiments, the crystallized aluminosilicate material comprises from about 20 to about 65 wt. % zeolite Y, for example, 30% to 65% by weight, or 30% to 45% by weight, expressed on the basis of the as-crystallized sodium faujasite form zeolite. In one or more embodiments, the Y-zeolite component of the crystalline aluminosilicate, in their sodium form, have a crystalline unit cell size range of between 24.64-24.73 Å, corresponding to a $SiO_2/Al_2O_3$ molar ratio of the Y-zeolite of about 4.1-5.2.

After crystallization by reaction in a seeded sodium silicate solution, the preformed microspheres contain crystalline Y-zeolite in the sodium form. Sodium cations in the microspheres are replaced with more desirable cations. This may be accomplished by contacting the microspheres with solutions containing ammonium, yttrium cations, rare earth cations or combinations thereof. In one or more embodiments, the ion exchange step or steps are carried out so that the resulting catalyst contains less than about 0.7%, more specifically less than about 0.5% and even more specifically less than about 0.2%, by weight $Na_2O$. After ion exchange, the microspheres are dried. Rare earth levels in the range of 0.1% to 12% by weight, specifically 1-5% by weight, and more specifically 2-3% by weight are contemplated. More specifically, examples of rare earth compounds are the nitrates of lanthanum, cerium, praseodymium, and neodymium. Typically, the amount of rare earth added to the catalyst as a rare earth oxide will range from about 1 to 5%, typically 2-3 wt. % rare earth oxide (REO).

Following ammonium and rare earth exchange, the rare-earth containing microsphere catalyst composition is further modified with phosphorus to provide a catalytic microsphere. The microsphere catalyst composition can be contacted with a medium containing an anion, for example, a dihydrogen phosphate anion ($H_2PO_4^-$), a dihydrogen phosphite anion ($H_2PO_3^-$) or mixtures thereof for a time sufficient to composite phosphorus, with the catalyst. Suitable amounts of phosphorus to be incorporated in the catalyst include at least about 0.5 weight percent, specifically at least about 0.7 weight percent, more specifically from about 1 to 4 weight percent, calculated as $P_2O_5$, based on the weight of the zeolite plus whatever matrix remains associated with the zeolite.

The anion is derived from a phosphorus-containing component selected from inorganic acids of phosphorus, salts of inorganic acids of phosphorus, and mixtures thereof. Suitable phosphorus-containing components include phosphorus acid ($H_3PO_3$), phosphoric acid ($H_3PO_4$), salts of phosphorus acid, salts of phosphoric acid and mixtures thereof. Although any soluble salts of phosphorus acid and phosphoric acid, such as alkali metal salts and ammonium salts may be used to provide the dihydrogen phosphate or phosphite anion, in specific embodiments, ammonium salts are used since the use of alkali metal salts would require subsequent removal of the alkali metal from the catalyst. In one embodiment, the anion is a dihydrogen phosphate anion derived from monoammonium phosphate, diammonium phosphate and mixtures thereof. Contact with the anion may be performed as at least one step of contacting or a series of contacts which may be a series of alternating and successive calcinations and dihydrogen phosphate or phosphite anion contacting steps. In specific embodiments, up to about 3-4% $P_2O_5$ content is achieved in a single step.

Contact of the anion with the zeolite and kaolin derived matrix is suitably conducted at a pH ranging from about 2 to about 8. The lower pH limit is selected to minimize loss of crystallinity of the zeolite. The upper pH limit appears to be set by the effect of the anion concentration. Suitable concentrations of the dihydrogen phosphate or dihydrogen phosphite anion in the liquid medium range from about 0.2 to about 10.0 weight percent anion.

In the above described procedure, the rare earth ion exchange is performed prior to addition of the phosphorus component. However, it will be understood that according to one or more embodiments, it may be desirable to add a phosphorus component prior to rare earth ion exchange. In other embodiments, it may be desirable to add the phosphorus component both prior to rare earth ion exchange and after rare earth ion exchange.

According to one or more embodiments, the catalyst comprises from about 1% to about 5% phosphorus ($P_2O_5$), including 1, 2, 3, 4, and 5%. In specific embodiments, the catalyst comprises at least 2% $P_2O_5$. A specific range is 2.5 to 3.5 wt. % $P_2O_5$.

Without intending to be bound by theory, it is thought that the sequential addition of a rare earth component followed by addition of a phosphorus component produces microspheres that are surface area stabilized. In other words, the catalytic microspheres are stabilized to resist loss of surface area during FCC cracking. It is believed that if the phosphorus component is added prior to the addition of the rare earth component, and no further phosphorus is added, the microspheres are not surface area stabilized. As used herein, the term "surface area stabilized" refers to catalytic microspheres that have an aged surface area that exceeds the aged surface area of catalytic microspheres in which the rare earth component and phosphorus component were not added sequentially. In one or more embodiments, a phosphorus component is added prior to the addition of a rare earth component, and then, after the rare earth component is added, an additional phosphorus component is added, such that the total phosphorus content is from about 1% to about 5% $P_2O_5$, including 1, 2, 3, 4, 5%.

According to one or more embodiments, the selectivity benefits of adding phosphorus result in enhanced metals passivation, particularly when phosphorus is added to a catalyst that contains transition alumina. In particular, in addition to surface area stabilization, phosphorus addition to a transition alumina-containing catalyst provides significant benefits, including lower hydrogen and coke yield and higher activity. Lowering hydrogen yields is beneficial in wet gas compressor-limited processes.

Subsequent to the rare earth exchange and phosphorus addition, catalyst composition is then dried and then calcined at a temperature of from 800°-1200° F. The conditions of the calcination are such that the unit cell size of the zeolite crystals is not significantly reduced. Typically, the drying step, after rare earth exchange is to remove a substantial portion of the water contained within the catalyst.

The rare earth oxide-containing catalyst, subsequent to calcination, is now further ion exchanged, typically by ammonium ions to, again, reduce the sodium content to less than about 0.5 wt. % $Na_2O$. The ammonium exchange can be repeated to ensure that the sodium content is reduced to less than 0.5 wt. % $Na_2O$. Typically, the sodium content will be reduced to below 0.2 wt. % as $Na_2O$. Subsequent to ammonium exchange, the reduced sodium catalyst containing the Y-type zeolite and the kaolin derived matrix can be contacted again with a medium containing the phosphorus compounds as described above, with respect to the first phosphorus treatment. The medium contains sufficient phosphorus to provide a content of phosphorus as $P_2O_5$ of at least 2.0 wt. % and, more typically, an amount of phosphorus as $P_2O_5$ of 2.8 to 3.5 wt. % relative to the catalyst, including zeolite and kaolin derived matrix. Temperatures and pH conditions for the second phosphorus treatment are as in the first treatment described above. After phosphorus treatment, the impregnated catalyst is calcined again at temperatures of from 700°-1500° F.

The catalysts of the invention can also be used in conjunction with additional V-traps. Thus, in one or more embodiments, the catalyst further comprises a V-trap. The V-trap can be selected from one or more conventional V-traps including, but not limited to, MgO/CaO Without intending to be bound by theory, it is thought that MgO/CaO interacts with $V_2O_5$ through an acid/base reaction to give vanadates.

A second aspect of the present invention pertains to a method of cracking a hydrocarbon feed under fluid catalytic cracking conditions. In one or more embodiments, the method comprises contacting the hydrocarbon feed with the phosphorus modified catalyst of one or more embodiments. In one or more embodiments, the hydrocarbon feed is a resid feed. In one or more embodiments, in a resid feed operation, one of Ni and V metals accumulate on the catalyst, and the FCC catalyst composition is effective to contact nickel and vanadium during cracking, thus reducing coke and hydrogen yields.

Conditions useful in operating FCC units utilizing catalyst of the invention are known in the art and are contemplated in using the catalysts of the invention. These conditions are described in numerous publications including Catal. Rev.—Sci. Eng., 18 (1), 1-150 (1978), which is herein incorporated by reference in its entirety. The catalysts of one or more embodiments are particularly useful in cracking residuum and resid-containing feeds.

A further aspect of the present invention pertains to a method of manufacturing an FCC catalyst composition. In one or more embodiments, the method comprises pre-forming a precursor microsphere comprising non-zeolitic matrix material and alumina; in situ crystallizing zeolite on the pre-formed microsphere to provide a zeolite-containing microsphere; adding a rare earth component to the zeolite-containing microsphere to provide a rare-earth-containing microsphere; and adding a phosphorus component to the rare-earth-containing microsphere to provide a catalytic microsphere. In one or more embodiments, the phosphorus is added by reacting/contacting the rare-earth-containing microsphere with diammonium phosphate. In specific embodiments, the rare earth component comprises lanthana, and the lanthana is introduced to the zeolite-containing microsphere by ion exchange.

In one or more embodiments, the method of manufacturing further comprises adding a phosphorus component to the zeolite-containing microsphere. In specific embodiments, the rare earth and the phosphorus component are added sequentially in separate steps.

In other embodiments, the method comprises adding a portion of the phosphorus component, then ion exchanging with the rare earth component, and then adding an additional phosphorus component. It is noted that adding the rare earth component and the phosphorus component at the same time may deleteriously affect catalytic activity.

The invention is now described with reference to the following examples.

EXAMPLES

Example 1

Calcined kaolin (mullite) (36.6 kg) slurry made to 49% solids was added to 59% solids hydrous kaolin (25.9 kg), while mixing, using a Cowles mixer. Next a 56% solids boehmite alumina (14 kg) slurry was slowly added to the mixing clay slurry and was allowed to mix for more than five minutes. The mixture was screened and transferred to a spray dryer feed tank. The clay/boehmite slurry was spray dried with sodium silicate injected in-line just prior to entering the atomizer. Sodium silicate (20.2 kg, 3.22 modulus) was used at a metered ratio of 1.14 liter/min slurry:0.38 liter/min silicate. The target particle size for the microspheres was 80 microns. Binder sodium was removed from the formed microspheres by slurrying the microspheres for thirty minutes and maintaining the pH from 3.5-4 using sulfuric acid. Finally, the acid neutralized microspheres were dried and calcined at 1350-1500° F. for two hours. The microspheres were processed to grow 60-65% zeolite Y using an in situ crystallization process. A sample of crystallized NaY microspheres (250 g) was ion exchanged to achieve a $Na_2O$ of 2.0% using ammonium nitrate. Rare earth was then added to 2 wt. % REO. The rare earth exchanged sample was calcined at 1000° F. for 2 hours to stabilize the catalyst and facilitate zeolitic sodium removal. After calcinations, a series of ammonium nitrate ion exchanges was performed to <0.2 wt. % $Na_2O$. Finally, with the reduced sodium, a second calcination was done at 1100° F. for 2 hours in order to further stabilize the catalyst and reduce unit cell size. To evaluate the resid catalyst in circulating riser unit, a sample (20 kg) was prepared following the process using a 25 gallon reactor vessel and pan filters for the ion exchange and P treatments. Calcinations were completed in covered trays in muffle ovens. The catalyst composition is further impregnated with 3000 ppm of nickel and 2500 ppm of vanadium and aged under cyclic reducing and oxidizing conditions in the presence of steam at between 1350-1500° F. The catalytic activity and selectivity of the catalyst composition is determined using Advanced Cracking Evaluation (ACE) reactors and protocols.

Example 2

Calcined kaolin (mullite) (36.6 kg) slurry made to 49% solids was added to 59% solids hydrous kaolin (25.9 kg), while mixing, using a Cowles mixer. Next a 56% solids boehmite alumina (14 kg) slurry was slowly added to the mixing clay slurry and was allowed to mix for more than five minutes. The mixture was screened and transferred to a spray dryer feed tank. The clay/boehmite slurry was spray dried with sodium silicate injected in-line just prior to entering the atomizer. Sodium silicate (20.2 kg, 3.22 modulus) was used at a metered ratio of 1.14 liter/min slurry:0.38 liter/min silicate. The target particle size for the microspheres was 80 microns. Binder sodium was removed from the formed microspheres by slurrying the microspheres for thirty minutes and maintaining the pH from 3.5-4 using sulfuric acid. Finally, the acid neutralized microspheres were dried and calcined at 1350-1500° F. for two hours. The microspheres were processed to grow 60-65% zeolite Y using an in situ crystallization process. A sample of crystallized NaY microspheres (250 g) was ion exchanged to achieve a $Na_2O$ of 2.0% using ammonium nitrate. The sodium adjusted sample was treated with phosphorus to 1.5% $P_2O_5$. Rare earth (lanthanum) was then added to 2 wt. % REO. The phosphorus and rare earth exchanged sample was calcined at 1000° F. for 2 hours to stabilize the catalyst and facilitate zeolitic sodium removal. After calcinations, a series of ammonium nitrate ion exchanges was performed to <0.2 wt. % $Na_2O$. Once at desired sodium level, a second phosphorus treatment was carried out to increase the total $P_2O_5$ to 3%. Finally, with the reduced sodium, a second calcination was done at 1100° F. for 2 hours in order to further stabilize the catalyst and reduce unit cell size. To evaluate the P modified resid catalyst in circulating riser unit, a sample (20 kg) was prepared following the process using a 25 gallon reactor vessel and pan filters for the ion exchange and P treatments. Calcinations were completed in covered trays in muffle ovens. The catalyst composition is further impregnated with 3000 ppm of nickel and 2500 ppm of vanadium and aged under cyclic reducing and oxidizing conditions in the presence of steam at between 1350-1500° F. The catalytic activity and selectivity of the catalyst composition is determined using Advanced Cracking Evaluation (ACE) reactors and protocols.

Example 3

The catalyst of Example 1 is combined with a separate particle vanadium trap prior to metals impregnation and deactivation and the catalytic activity and selectivity of the catalyst composition is determined using Advanced Cracking Evaluation (ACE) reactors and protocols.

Example 4

The catalyst of Example 2 is combined with a separate particle vanadium trap prior to metals impregnation deactivation and the catalytic activity and selectivity of the catalyst composition is determined using Advanced Cracking Evaluation (ACE) reactors and protocols.

Results

Characterization and catalytic testing results at 70% conversion are presented in Table 1.

TABLE 4

ACE results On a Resid Feed

|  | Example 2 (Invention) | -Example 1 (Comparative) | Example 4 (Invention) | Example 3 (Comparative) |
|---|---|---|---|---|
| $H_2$ | 0.29 | 0.38 | 0.20 | 0.30 |
| Propylene | 4.34 | 4.15 | 4.57 | 4.56 |
| LPG | 14.42 | 14.21 | 15.08 | 14.68 |
| Total C4 | 16.47 | 16.41 | 17.01 | 16.76 |
| Gasoline | 43.98 | 43.72 | 44.25 | 44.03 |
| LCO | 15.29 | 15.98 | 15.65 | 15.92 |
| HCO | 14.71 | 14.02 | 14.35 | 14.08 |
| Coke | 9.54 | 9.88 | 8.74 | 9.21 |
| Cat/Oil | 3.06 | 2.81 | 3.44 | 3.34 |
| Activity @ C/O = 7.7 | 4.52 | 4.56 | 4.27 | 4.25 |
| Conversion @ C/O = 7.7 | 81.88 | 82.02 | 81.04 | 80.94 |

ACE testing of the catalyst impregnated with nickel and vanadium reveal that at 70 wt. % conversion relative to Example 1, Example 2 gives: 24% lower hydrogen, 3% lower coke, along with 0.6% higher gasoline, and 4.5% higher propylene, with nearly equivalent LPG and total C4 at equivalent activity.

Example 3 combines Example 1 with a separate particle vanadium trap, and Example 4 combines Example 2 with a separate particle vanadium trap. The results indicate that the catalyst of Example 4 offers benefits over the catalyst of Example 3 including: 33% lower hydrogen and 5% lower coke.

Examples 5 and 6

The Examples 3 and 4 described above were prepared according to the procedure explained above and were tested in a pilot-scale FCC unit using two different types of feeds after loading with contaminant metals (3000 ppm Ni and 2500 ppm V) followed by hydrothermal deactivation.

Figure 1:
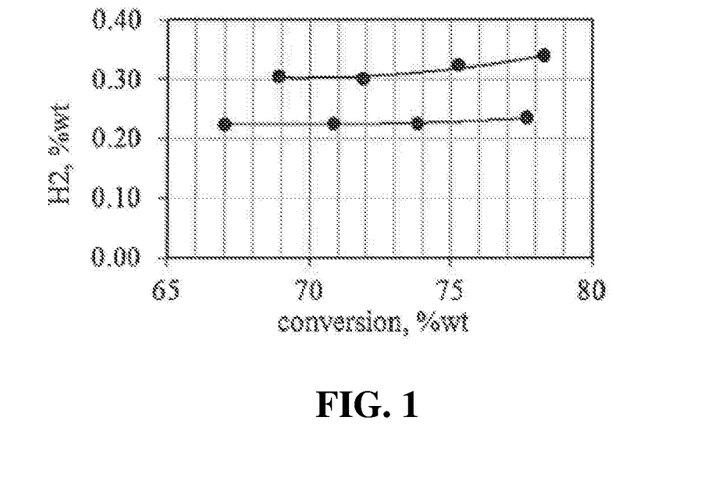
FIG. 1 is a graph comparing the hydrogen yields of cracking catalysts according to one or more embodiments and comparative catalysts upon cracking a heavy aromatic feed.
Figure 2:
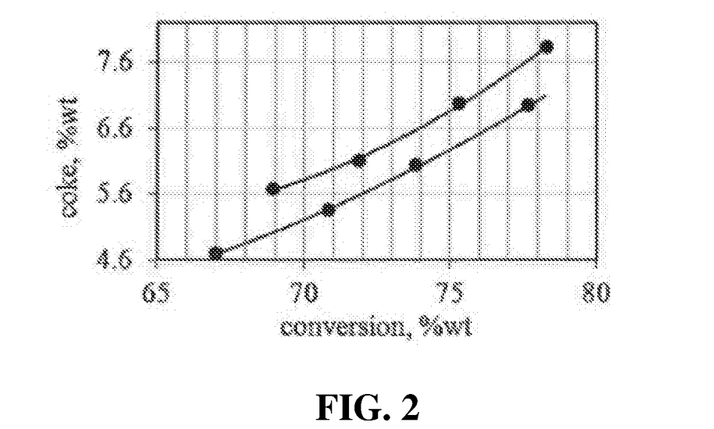
FIG. 2 is a graph comparing the contaminant coke yields of cracking catalysts according to one or more embodiments and comparative catalysts upon cracking a heavy aromatic feed.
Figure 3:
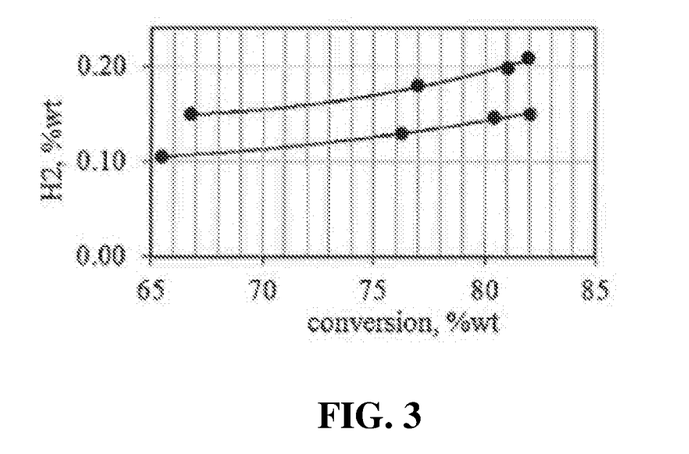
FIG. 3 is a graph comparing the hydrogen yields of cracking catalysts according one or more embodiments and comparative catalysts upon cracking a light feed.
Figure 4:
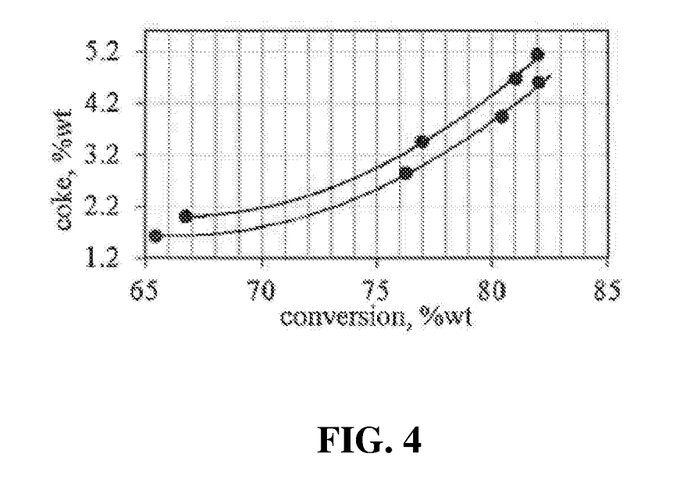
FIG. 4 is a graph comparing the contaminant coke yields of cracking catalysts according to one or more embodiments and comparative catalysts upon cracking a light aromatic feed.

FIGS. 1-2 present the results for coke and $H_2$ for a resid feed. FIGS. 3-4 present the results for coke and $H_2$ for a lighter (VGO) feed.

Example 7

Double Stage Phosphorus Addition

Following the process in Example 2, a sample was prepared having a rare earth content of 2 percent by weight and phosphorus total was 3% $P_2O_5$.

Example 8

Single Stage Phosphorus Addition

Similar to the process in Example 2, a sample was prepared, whereby a phosphorus addition was employed only during the second application stage as described in example 2. Rare earth was 2% REO and phosphorus total was 3% $P_2O_5$ added in one stage.

Example 9

Comparative Example (No Phosphorus)

Using the microspheres of Example 1, an FCC catalyst was prepared having a rare earth content of 2 percent by weight.

The three samples (Examples 7, 8, and 9) were prepared for ACE catalytic evaluation using the following protocol:
Presteamed at 1350° F./2 hours/100% stem
Impregnated with 3000 ppm Ni and 3000 ppm V
Steamed 1500° F./5 hour/90% steam and 10% air
Catalytic evaluation is presented in Table V. The results are shown at constant 70 wt. % conversion.

TABLE 2

ACE Results

|  | Example 9 0% $P_2O_5$ | Example 7 Single Stage 3% $P_2O_5$ | Example 8 Double Stage 3% $P_2O_5$ |
|---|---|---|---|
| $H_2$ | 1.34 | 1.09 | 1.23 |
| Propylene | 4.07 | 4.30 | 4.19 |
| LPG | 13.19 | 14.62 | 14.18 |
| Gasoline | 42.88 | 42.91 | 43.07 |
| LCO | 17.48 | 15.85 | 16.57 |
| HCO | 12.53 | 14.16 | 13.43 |
| Coke | 10.34 | 9.22 | 9.32 |
| Cat/Oil | 7.43 | 6.34 | 6.75 |
| Activity @ C/O = 7.7 | 2.39 | 2.60 | 2.53 |
| Conversion @ C/O = 7.7 | 70.47 | 72.22 | 71.64 |

Examples 7 and 8 show preferred hydrogen and coke yields compared to Example 9.

All references, including publications, patent applications, and patents, cited herein are hereby incorporated by reference for all purposes to the same extent as if each reference were individually and specifically indicated to be incorporated by reference and were set forth in its entirety herein.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of manufacturing a fluid catalytic cracking (FCC) catalyst,
the method comprising:
pre-forming a precursor microsphere comprising a non-zeolitic material and alumina;
in situ crystallizing a Y zeolite on the pre-formed microsphere to provide a zeolite containing microsphere;
adding a first portion of a phosphorus component to the zeolite-containing microsphere to form a first phosphorus-modified microsphere;
adding a rare earth component to the first phosphorus-modified microsphere to provide a rare earth-containing microsphere; and
adding a second portion of the phosphorus component to the rare earth-containing precursor microsphere to provide a catalytic microsphere.

2. The method of claim 1, wherein the non-zeolitic material is selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina silica, silica-alumina, silica-magnesia, magnesia, and sepiolite.

3. The method of claim 2, wherein the zeolite comprises a crystallized aluminosilicate material comprising about 20 to about 65 wt. % zeolite Y.

4. The method of claim 3, wherein the method further comprises adding an ammonium component.

5. The method of claim 4, wherein the rare-earth component is selected from one or more of ceria, lanthana, praseodymia, and neodymia.

6. The method of claim 5, wherein the rare earth component comprises lanthana, wherein the lanthana is added by ion exchange.

7. The method of claim 6, wherein the ion exchanging is carried out until the resulting catalyst comprises less than 0.2 wt % of $Na_2O$.

8. The method of claim 7, wherein the phosphorus component is added by contacting with phosphorus acid, phosphoric acid, salts of phosphorus acid, salts of phosphoric acid, or combinations thereof.

9. The method of claim 7, wherein the phosphorus component is added by contacting with monoammonium phosphate, diammonium phosphate, and mixtures thereof.

10. The method of claim 9, wherein the contacting is carried out until the phosphorus component is present in an amount of about 1% to about 5% by weight on an oxide basis.

11. The method of claim 9, further comprising adding a phosphorus component to the zeolite-containing microsphere.

12. A method of manufacturing an FCC catalyst, the method comprising:
    pre-forming a precursor microsphere comprising a non-zeolitic material and alumina;
    in situ crystallizing a Y zeolite on the pre-formed microsphere to provide a zeolite containing microsphere;
    adding a first portion of a phosphorus component to the rare earth-containing precursor microsphere to provide a phosphorus-modified microsphere;
    adding a rare earth component to the zeolite-containing microsphere to provide a rare earth-containing microsphere; and
    adding a second portion of the phosphorus component to the rare earth-containing precursor microsphere to provide a catalytic microsphere;
    wherein the FCC catalyst comprises,
        5% to 25% by weight of a transition alumina;
        20% to 65% by weight of the Y zeolite, wherein the zeolite is intergrown with the non-zeolite component; and
        1% to 5% by weight of the phosphorus component on an oxide basis;
    wherein the FCC catalyst is effective in preventing at least one of nickel and vanadium from increasing coke and hydrogen yields during cracking of a hydrocarbon.

13. The method of claim 12, wherein the rare-earth component is selected from one or more of ceria, lanthana, praseodymia, and neodymia.

14. The method of claim 13, wherein the phosphorus component is added by contacting with monoammonium phosphate, diammonium phosphate, and mixtures thereof.

15. The method of claim 14, wherein the amount of phosphorus component is 2.5 to 3.5wt. % on an oxide basis.

* * * * *